United States Patent [19]

Jennet et al.

[11] Patent Number: 4,849,062

[45] Date of Patent: Jul. 18, 1989

[54] MACHINE FOR FORMING A FLAT STACK OF SHEETS OF PREDETERMINED FORMAT

[75] Inventors: Michel Jennet, Bourgoin Jallieu; Jean-Claude G. M. Luce, Bouguenais, both of France

[73] Assignees: Societe a Responsabilite Limitee, Coopelin; Societe Nationale Industrielle SA, Aerospatiale, both of France

[21] Appl. No.: 212,576

[22] Filed: Jun. 28, 1988

[30] Foreign Application Priority Data

Jun. 30, 1987 [FR] France ............... 87 09431

[51] Int. Cl.$^4$ ........................... B32B 31/00
[52] U.S. Cl. ..................... 156/364; 156/197; 156/556; 156/559; 156/363
[58] Field of Search ........ 156/230, 197, 350, 363-364, 156/556-559, 563, 574, 571-572

[56] References Cited

U.S. PATENT DOCUMENTS

| | | |
|---|---|---|
| 3,304,822 | 2/1967 | Barnes et al. |
| 3,493,450 | 2/1970 | Judge ............................... 156/197 |
| 3,962,026 | 6/1976 | Lottridge ......................... 156/584 |
| 4,505,771 | 3/1985 | George ............................. 156/556 |
| 4,541,886 | 9/1985 | Marlow et al. ............... 156/350 X |
| 4,588,871 | 5/1986 | Etcheparre et al. . |

FOREIGN PATENT DOCUMENTS 1496628 8/1967 France .

Primary Examiner—David Simmons
Attorney, Agent, or Firm—Bacon & Thomas

[57] ABSTRACT

Sheets are stacked flat. The machine for implementing the invention comprises:
a horizontal work surface (5) delimiting a laying template which defines a transverse median axis (7);
a superposed delivery plane (10) for conveying individual sheets (1) bearing stripes of glue (2);
a pair of parallel horizontal axis suction cylinders (13, 14) located between the work surface and the delivery plane, and disposed on either side of a vertical median plane (P—P');
means (15) for counting the stripes of glue on each sheet to locate the middle stripe thereon; and p0 means (16) for localized gluing of the middle stripe of the sheet to be laid.

Applicable to structures having alternating stripes of glue.

15 Claims, 7 Drawing Sheets

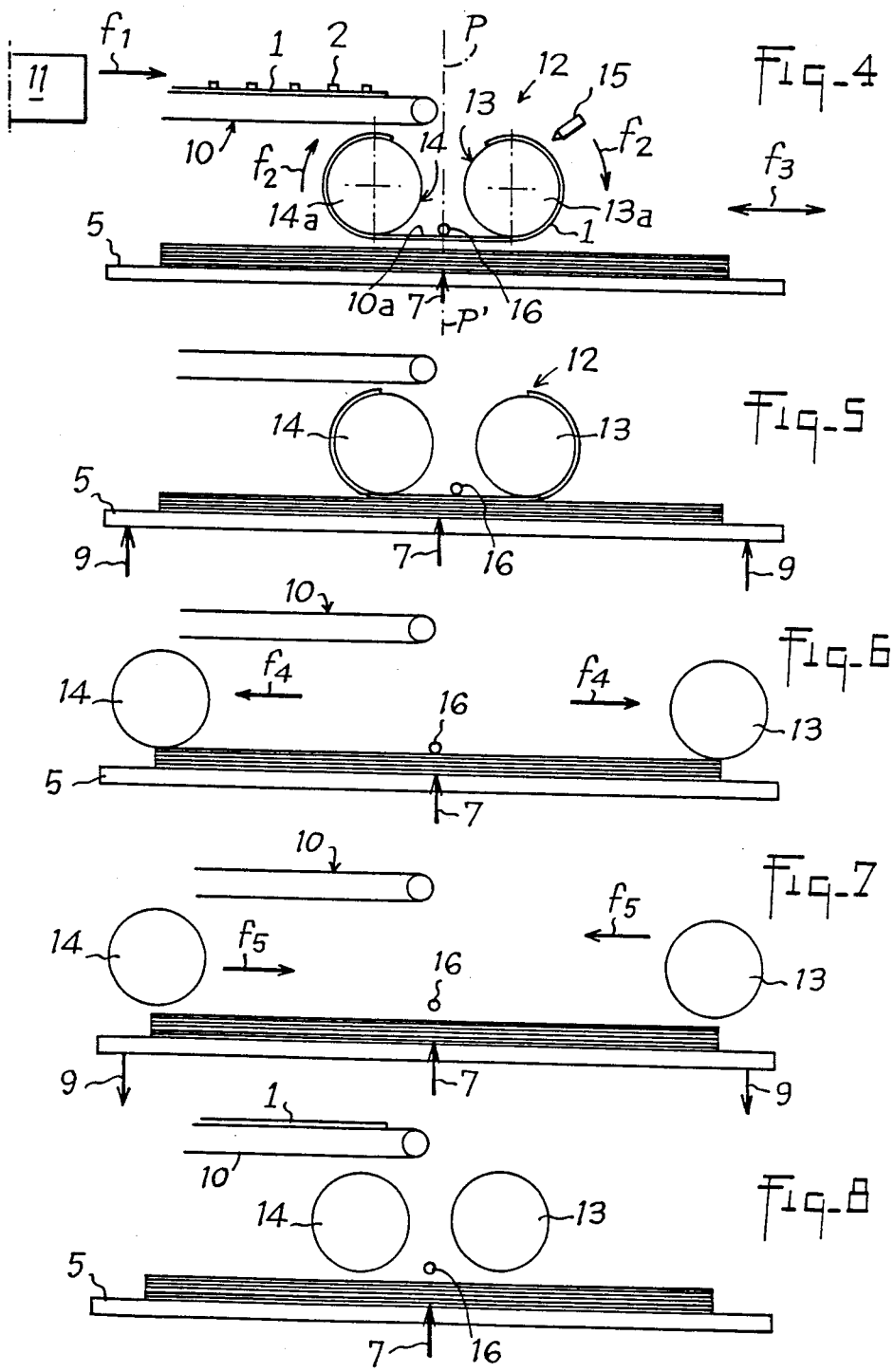

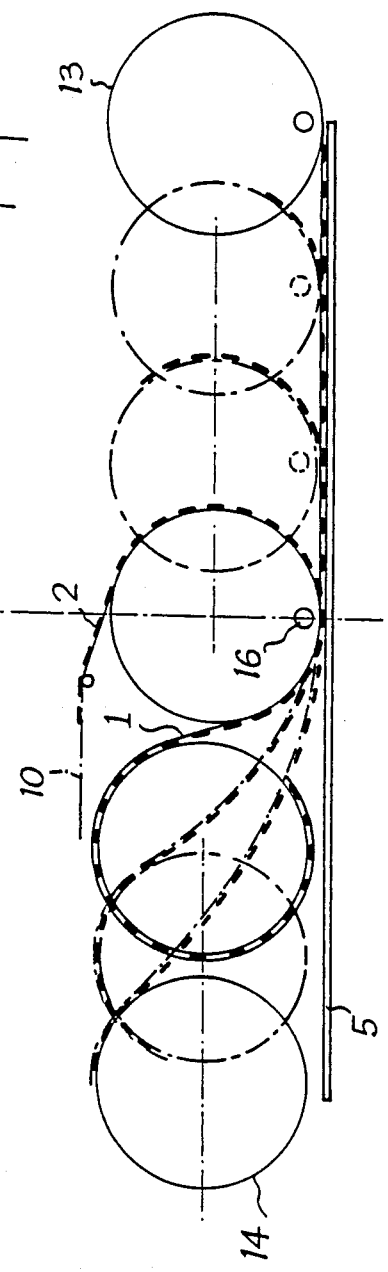
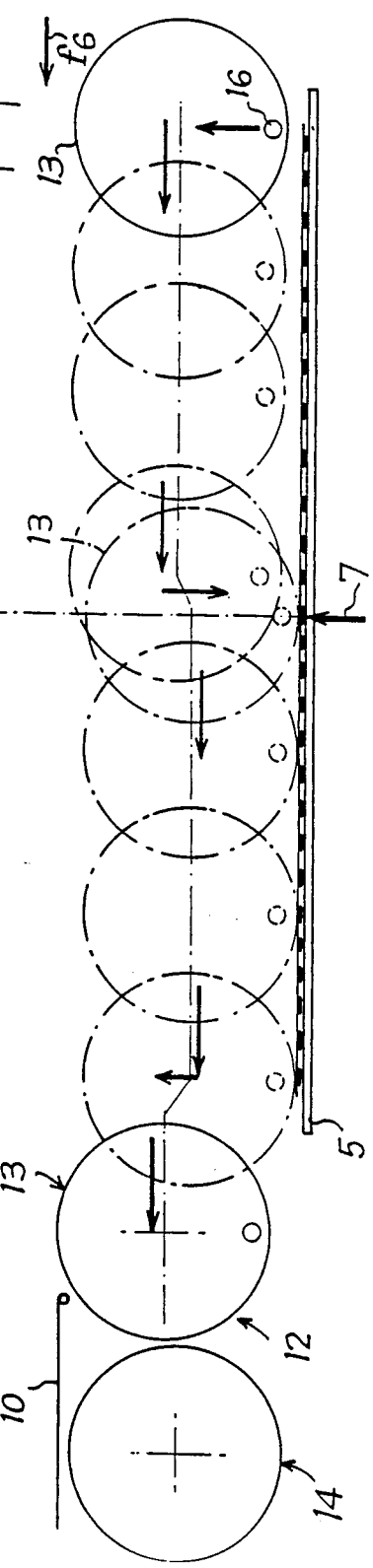

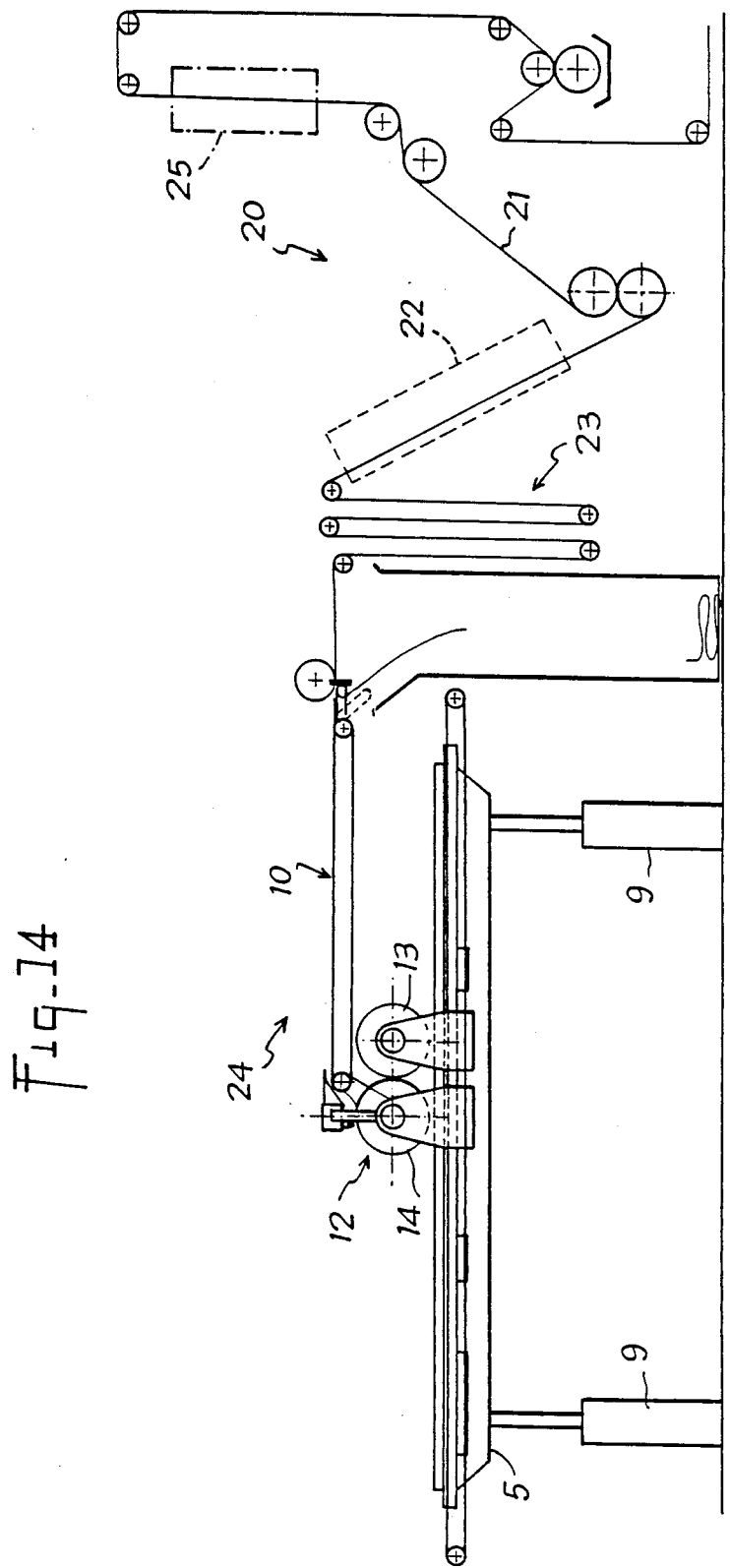

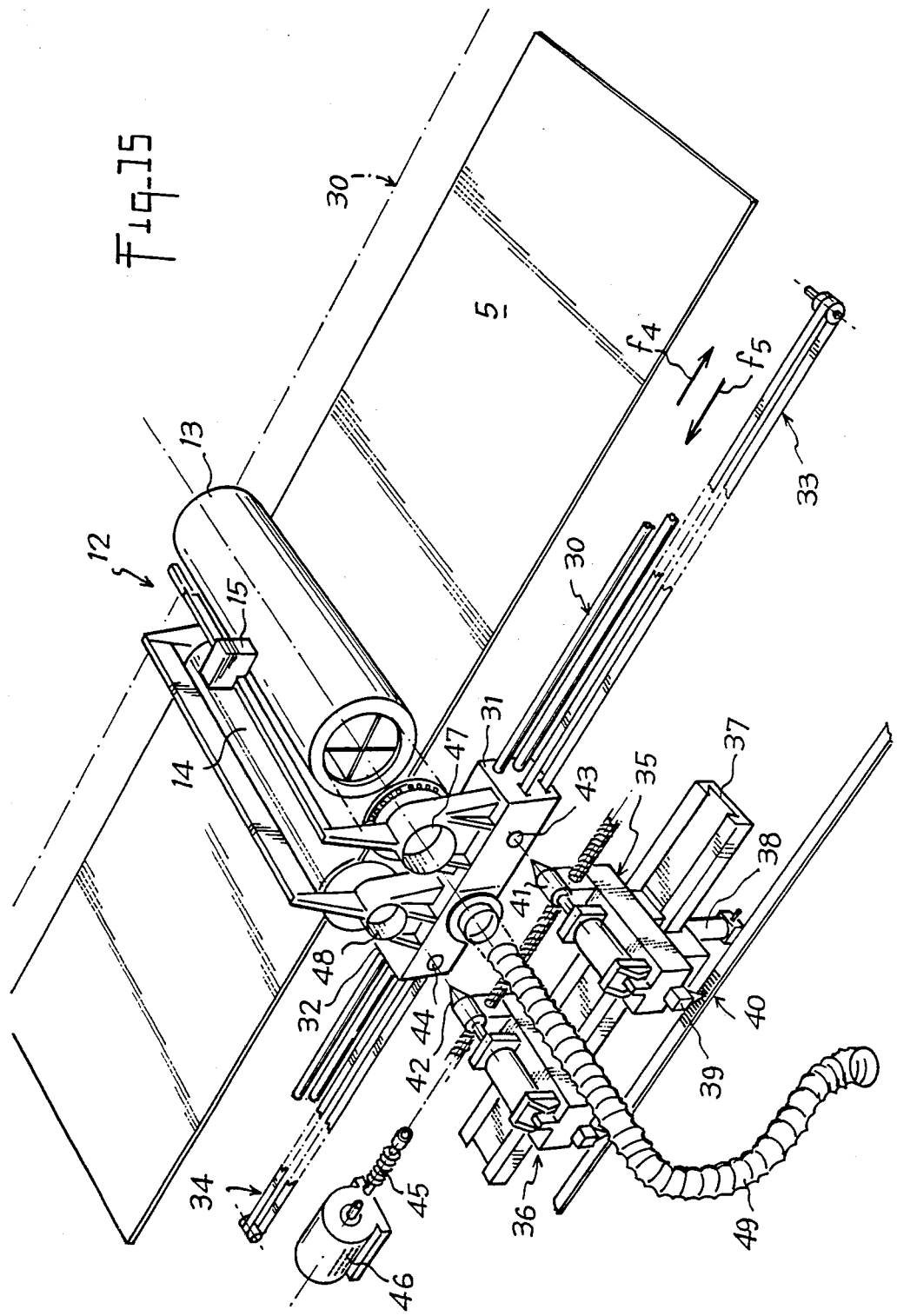

MACHINE FOR FORMING A FLAT STACK OF SHEETS OF PREDETERMINED FORMAT

The present invention relates to stacking sheets of the same predetermined format, which sheets are to be superposed exactly so as to make possible subsequent stages of processing, shaping, or execution depending on the specific character of the use or the application for which such a stack is intended.

More precisely, the invention relates to the technical field of manufacturing honeycomb type cellular structures.

BACKGROUND OF THE INVENTION

The manufacture of a honeycomb structure makes use of a stack of sheets 1 as shown in FIG. 1. Each of such same-format sheets is initially coated on one of its faces, e.g. face 1a, with equidistant stripes of glue 2 at a pitch p and extending generally parallel to one another and to a longitudinal median axis such as x—x'.

As shown in FIG. 2, the sheets 1 are then stacked on top of one another and in the same orientation so that the stripes of glue on each sheet are pressed against the non-glued face of the sheet immediately beneath it.

In order to obtain a cellular structure, the superposed sheets are, in addition, disposed in an alternating offset configuration perpendicular to the general direction of the stripes 2 by an amount corresponding to one half of the pitch ($\frac{1}{2}$p) of the stripe spacing.

A stack of sheets 1 made of in this way is then placed in a press which either directly or indirectly causes the stripes of glue to melt in order to stick the sheets together.

The prior technique of making the stack, as described in French patent number FR-A-No. 1 496 628, for example, has been to superpose the sheets running from a reference abutment 4 against which one edge of each sheet is applied parallel to the axis x—x' (FIG. 2).

This stacking technique has proved unsatisfactory for at least two main reasons.

The sheets 1 used are generally obtained from thin films, plies, or strips having little strength of their own, in particular against twisting. As a result, each sheet suffers from cutting distortion and it is impossible to guarantee accurate superposition merely by using an abutment 4.

In general, the machines for applying the successive stripes of glue 2 are not capable of ensuring that the pitch p between successive stripes 2 is highly accurate.

These two reasons give rise to a relative positioning errors, which can sometimes be large, between the stripes of glue on successive sheets in a stack, such that the subsequent gluing operation is faulty and unsuitable for obtaining a cellular structure having uniform cells.

These two reasons are the cause of the difficulties encountered in using automatic manufacturing means to obtain assembled structures with regularly alternating stripes of glue.

The present invention seeks to remedy the above drawbacks by providing a novel machine for forming a flat stack of sheets having a predetermined identical format.

SUMMARY OF THE INVENTION

The present invention provides a machine for forming a flat stack of sheets of predetermined format, each of said sheets being provided on one of its faces with parallel stripes of glue at a constant pitch or interval (p), the machine consisting in:

means for picking up a sheet and wrapping at least a portion of a sheet over a pick-up and applicator device constituted by first and second mutually parallel rotary cylinders disposed over a work surface defining a laying template whose median axis is referenced and which is provided with a first sheet, such that the sheet to be stacked is wound over the first cylinder making contact therewith via its face which does not include stripes of glue;

means for counting the number of stripes of glue that pass while the sheet is being wrapped onto the device;

means for stopping cylinder rotation when the detected middle stripe of the sheet is located approximately vertically over the median axis;

means for measuring the error between the position of said middle stripe and the median axis of the laying template;

means for adjusting the position of said device to cause said middle stripe to coincide vertically with the median axis;

means for bringing the work surface and said device closer to each other;

means for fixing the sheet to be stacked on the preceding sheet by localized melting of the middle stripe of glue;

means for separating the two cylinders to unwrap the two halves of the sheet to be stacked and to apply them against the preceding sheet;

means for moving the work surface and said device apart from each other;

means for moving the cylinders towards each other; and means for picking up the next sheet under the same conditions and, additionally, ensuring that after adjusting the position of the middle stripe relative to the median axis, said stripe is offset in alternation relative to said axis through a distance equal to one half of the pitch.

BRIEF DESCRIPTION OF THE DRAWINGS

Embodiments of the invention are described by way of example with reference to the accompanying drawings, in which:

FIGS. 4 to 8 are diagrams showing one implementation of the invention;

FIGS. 9 to 13 are diagrams showing a variant implementation of the method;

FIG. 14 is a diagrammatic elevation of an installation or a machine implementing the invention;

FIG. 15 is a diagrammatic exploded perspective view of some of the component elements appearing in FIG. 14.

MORE DETAILED DESCRIPTION

Figure 1:
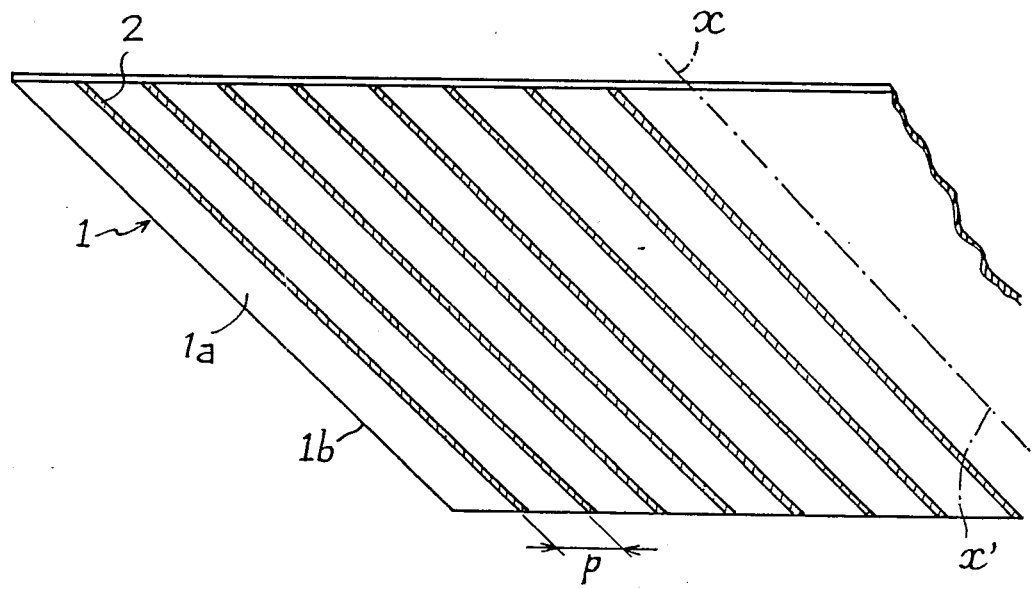
FIG. 1 is a perspective view of the component elements of a structure requiring alternating stripes of glue.

The invention concerns forming a flat stack of sheets of predetermined identical format, e.g. of sheets such as the sheet 1 shown in FIG. 1, and for the purpose of forming a structure requiring alternating stripes of glue. The invention does not concern the techniques and/or the equipment used for delivering the sheets 1 and for applying glue thereto. This equipment should be considered as forming part of the prior art.

Figure 3:
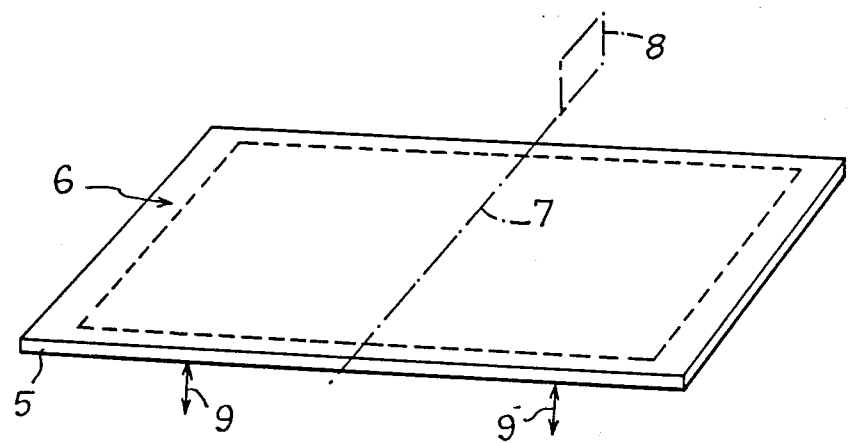
FIG. 3 is a perspective view showing a component element of the present invention.

The method implemented by a machine of the invention begins, as shown in FIG. 3, by providing a work surface 5 defining a laying template 6 corresponding to the format of the sheets 1 to be stacked. The template 6 is constituted by a median laying axis 7 extending transversely to the length direction of the format of the sheets 1. The transverse median axis 7 is generally placed in relationship with a reference system 8 of any appropriate type lying outside the work surface 5.

The work surface 5 is mounted on raising and lowering members 9 which may be provided in any suitable manner. In particular, the members 9 may be constituted by hydraulic, pneumatic, or electrical actuators which directly or indirectly constitute supporting legs for the work surface 5.

As shown in FIG. 4, the work surface 5 is disposed beneath and parallel to a delivery plane 10 for delivering pre-glued sheets 1. The plane 10 may be constituted, for example, by an endless conveyor for displacing each sheet 1 in the direction of arrow $f_1$ from a station 11 for cutting off sheets and/or applying glue thereto. The conveyor 10 displaces each sheet 1 while supporting it in such a manner as to ensure that the stripes of glue are all upwardly directed.

The invention makes use of a pick-up and applicator device 12 disposed between the delivery plane 10 and the work surface 5 for picking up each sheet 1 and applying it to the work surface 5. The device 12 is constituted by a pair of cylinders comprising a first cylinder 13 and a second cylinder 14 having parallel axes in plane P—P' passing through the reference 8 and the axis 7. Each of the cylinders 13 and 14 is constituted by a fixed structure and by a perforated rotary cylindrical envelope. The fixed structure and the perforated rotary envelope define angular sectors which may be selectively connected to circuits for applying pressure and/or suction.

In the example shown in FIGS. 4 to 8, the cylinders 13 and 14 rotate in the same direction as shown by arrow $f_2$, and include sectors 13a and 14a each occupying about 180° and facing away from the other about the median plane P—P', said sectors being suitable for connection to one or two suction circuits.

The first stage of the method implemented by the invention consists in delivering a sheet 1 via the plane 10 so that it falls under gravity onto the top portion of the sector 13a of the first cylinder 13. The sector 13a is put into communication with the suction circuit and sets up a suction effect over the entire angular periphery of the sector 13a, and the perforated rotary envelope is rotated so as to pick up the sheet 1 progressively as it is delivered from the plane 10. The sheet 1 is thus wrapped around the periphery of the cylinder 13 which it leaves after winding through 180°. The sheet 1 is then picked up by the suction sector 14a of the cylinder 14 around which the sheet is also wound through about 180°.

When the sheet 1 is wrapped around the pair of cylinders, there remains a taut portion of sheet 10a between the cylinders and extending in a generally horizontal manner parallel to the work surface 5.

The wrapping of the sheet 1 around the pair of cylinders 13 and 14 is monitored by a reader 15 for counting the number of stripes of glue 2 that have passed it since the leading transverse edge of the sheet 1. The purpose of counting the stripes 2 is to determine the presence and the position of the middle stripe 2 which should correspond to the axis x—x', either relative to the reference 8 or else relative to the vertical over the transverse median axis 7 of the template 6. When one or other of these conditions is satisfied, the reader 15 stops the cylinders 13 and 14 from rotating.

Measuring means, such as the reference 8, then determine the error that actually exists between the vertical plane passing through the middle stripe x—x' of the sheet 1 and the transverse median axis 7. Once this error is measured, the pair of cylinders is displaced in one or other direction of double-headed arrow $f_3$ so as to bring the middle stripe vertically over the median axis 7.

After the error has been compensated, and when the sheet 1 is the first sheet to be put into place, the work surface 5 is raised by the means 9 as shown in FIG. 5 so as to apply the work surface against the cylinders 13 and 14 of the pair 12, or else to apply the topmost stacked sheet thereagainst.

In this position, localized heating means 16 are activated to heat the middle stripe x—x' so as to glue a portion of the sheet 1 wrapped around the cylinders 13 and 14 onto a first or base sheet lying directly on the work surface 5. In the present case, the means 16 may be constituted by a sequence of electrodes lying in the plane P—P' and suitable for being selectively heated, element by element or group of elements by group of elements.

After a portion of the sheet wrapped around the cylinders 13 and 14 has been glued into place, the applicator device 12 is controlled, as shown in FIG. 6, to move the cylinders 13 and 14 away from each other in opposite directions as shown by arrows $f_4$. By moving the two cylinders 13 and 14 away from each other, the two half-portions of the sheet 1 are unwrapped simultaneously and they are also simultaneously applied to the base sheet lying on the work surface 5. The moving apart stage along arrows $f_4$ causes the two half portions of the sheet to be laid accurately and simultaneously expels any air that may be imprisoned between these half-portions and the preceding sheet.

In a subsequent stage, shown in FIG. 7, the work surface 5 is lowered by the member 9 so as to allow the cylinders 13 and 14 to move back towards each other as shown by arrows $f_5$.

Figure 2:
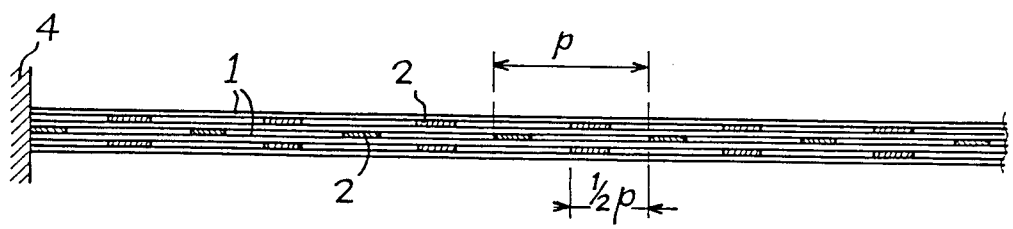
FIG. 2 is a diagram showing one stage in the general prior art method of forming a cellular structure.

FIGS. 4 to 8 show the elementary operating cycle corresponding to the method implemented by the invention. Each successive cycle takes place in the same manner for the different sheets that are to be stacked. However, during alternate sheet application cycle after the first, in addition to the above-described operations, account must also be taken (after correcting the alignment between the middle stripe x—x' and the transverse median axis 7) of the required alternating offset of the middle stripe through one half of the pitch ($\frac{1}{2}$p) as shown in FIG. 2 in order to ensure that the stripes of glue in the subsequently obtained structure alternate properly.

In other words, the method implemented by the invention consists in using an applicator device 12 of the suction cylinder type to pick up each sheet to be stacked, to wrap said sheet at least partially about itself in order to align the middle stripe of glue on the sheet with a fixed reference corresponding to the transverse median axis of a template, to compensate for alignment errors that may exist in the position in which the applicator device comes to rest, and then to displace the position of alternate middle stripes through one half of the pitch relative to the middle stripe of the previous sheet, and then to put the sheet into place prior to simultaneously unwrapping its two half-portions.

This method of proceeding thus makes it possible at least to halve the alignment uncertainties compared with the conventional method which consisted in putting a sheet into position by placing one of its transverse edges into relationship with an end reference and then in spreading out the entire surface of the sheet in a single direction.

Figure 9:
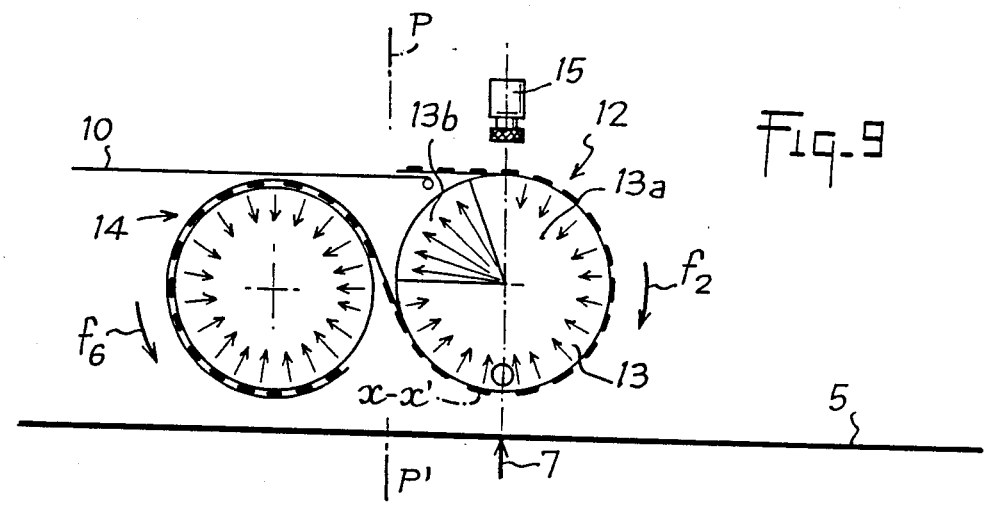

FIG. 9 shows a variant in which the applicator device constituted by the pair of cylinders 12 comprises a first cylinder 13 rotating in the direction of arrow $f_2$ and a second cylinder 14 rotating in the opposite direction shown by arrow $f_6$. In the take-up position and in the application position the power of cylinders 12 is disposed in such a manner that the vertical plane passing through the axis of the first cylinder is substantially in alignment with the transverse median axis 7 of the work surface 5.

The first cylinder 13 includes a suction sector 13a extending substantially over three fourths of its periphery, and the entire periphery of the cylinder 14 is subjected to a suction effect.

As in the preceding example, a sheet 1 is picked up by being wrapped around the rotary perforated envelope of the first cylinder 13 with the stripes of glue 2 pointing outwardly. The sheet is wrapped around about 270° of the first cylinder, beyond which it is picked up by the suction effect from the perforated rotary envelope of the other cylinder 14. In order to facilitate this transfer, the first cylinder 13 advantageously includes a sector 13b which is in communication with a pressure circuit. The resulting localized blowing helps unstick the sheet from the envelope and helps the substantially contiguous other cylinder 14 to pick it up by suction. The resulting wrapping follows a generally figure-of-eight shaped path by wrapping a part of the sheet in succession over both cylinders 13 and 14.

Figure 10:
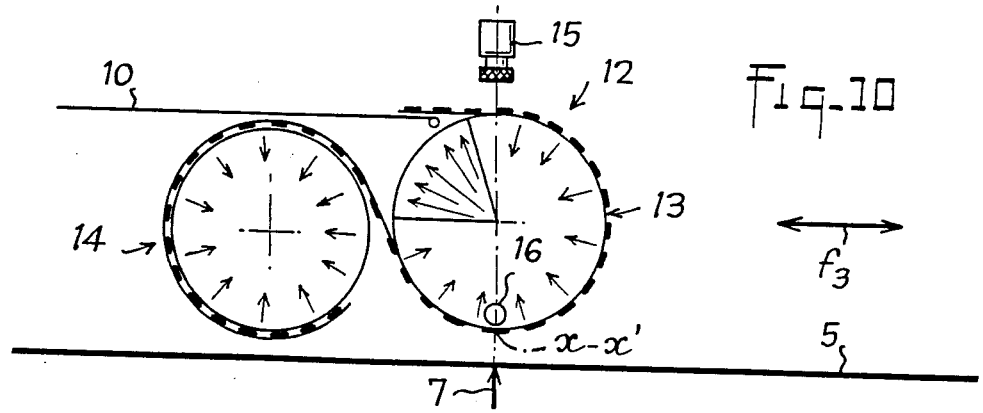

As before, the above-described wrapping is monitored by the reader 15 for determining the position of the middle stripe x—x' of the wrapped sheet relative to the vertical plane passing through the median axis 7. Once this position has been determined, the device 12 is displaced in one or other of the directions of double headed arrow $f_3$ in order to bring the middle stripe x—x' into exact alignment with the axis 7, prior to performing the alternating half pitch offset ($\frac{1}{2}$p) (FIG. 10).

Figure 11:
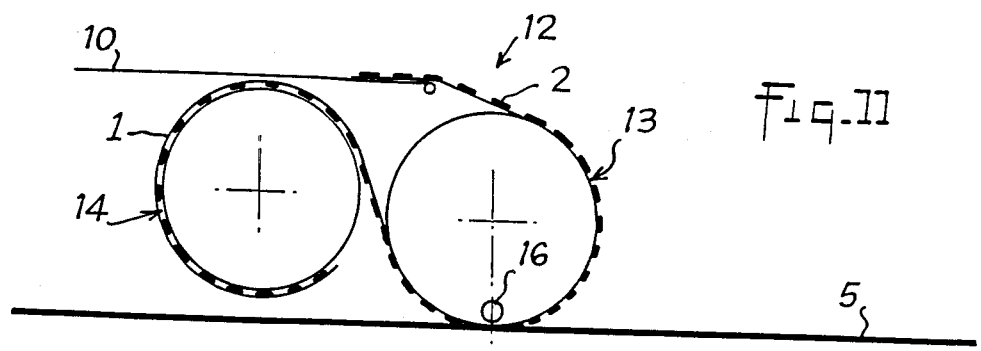

FIG. 11 shows that relative vertical displacement is performed when in this position in order to apply the middle stripe x—x' against the topmost sheet on the work surface 5. This relative displacement may be achieved, for example, by lowering the cylinder 13 so as to leave a gap between the cylinder 14 and the preceding sheet. When in this position, the heater bar 16 is actuated in order to cause localized sticking of the glue along the middle stripe x—x' of the wrapped sheet. The means 16 may be constituted by a slope carried by the fixed structure of the cylinder 13 and suitable for being fed with conventional heating means in order to perform the same function as the above-described means.

After the sheet has been stuck into place, the cylinders 13 and 14 are moved apart from each other along arrows $f_4$. The cylinder 13 which is in contact with the underlying sheet applies the corresponding half of the sheet 1 directly and expels air. The cylinder 14 deposits its half of the sheet by allowing the sheet to slide slide off the cylinder as illustrated in FIG. 12.

The moving apart stage is then followed by a stage in which the cylinders 13 and 14 move back towards each other in order to return the pair of cylinders 12 to the initial position.

In a variant embodiment, the pair of cylinders may be placed in a first sheet pick-up position which is offset laterally relative to the application position corresponding to the middle stripe x—x' being in alignment with the transverse median axis 7. In this case, following the moving apart stage shown in FIG. 12, the cylinder 13 is raised as shown in FIG. 13, and then the cylinders 13 and 14 are caused to move in the direction of arrow $f_6$. Displacement in this direction brings the cylinder 14 to its initial position and brings the cylinder 13 to a position substantially vertically over the transverse median axis 7. In this position, the cylinder 13 is lowered again in order to run over the second half of the sheet that has been put into place, thereby suitably and completely expelling any air that may remain between said second half of the sheet and the sheet immediately below it. When the cylinder 13 has reached the end of the corresponding half of the sheet, it is raised in order to return to its position where it co-operates with the cylinder 14, i.e. to the state in which the sheet picking-up operation of the following cycle can take place, as described above.

By way of example, FIGS. 14 and 15 show one possible construction of a machine for implementing the above-described methods. Such a machine is intended to be associated with an installation 20 for continuously paying out a strip 21 of any suitable substance, which is paid out from a drum (not shown). The strip 21 passes through an examination and monitoring enclosure 22 fitted with any suitable means for detecting defects in the strip. On leaving the enclosure 22, the strip 21 is picked up by an accumulator 23 which conveys the sheet to a laying and stacking machine 24. In conventional manner, the installation 20 includes a station 25 for applying the stripes of glue 2 to one of the faces of the strip 21.

As is usual, the machine 24 comprises a framework (not shown in the drawings) for supporting its various component parts and, in particular for supporting the work surface 5, the superposed delivery plane 10, and the means for supporting the pair of cylinders 12. These support means are mainly constituted by slideway systems 30 for supporting and guiding two frames 31 and 32 which carry the cylinders 13 and 14, respectively. Each frame 31 or 32 is associated with an individual drive system 33 or 34 for driving it in the directions of arrows $f_4$ and $f_5$. The drive systems 33 and 34 may make use of independent motors or of a single motor in conjunction with a transmission and clutching device.

The frames 31 and 32 are provided to co-operate with indexing units 35 and 36 mounted on a support and guide bench 37 defining a slide rail. Each of the units 35 and 36 is provided with a clamping means 38 suitable for locking it in an exact position that can be determined by a reader 39 disposed to co-operate with graduations on a scale 40. The indexing units 35 and 36 include extensible pegs 41 and 42, e.g. under the control of hydraulic actuators, having tapering heads for being received in complementary recesses 43 and 44 provided in the frames 31 and 32. The units 35 and 36 are coupled to a single transmission 45 which is actuated by a reversible motor 46.

Figure 16:
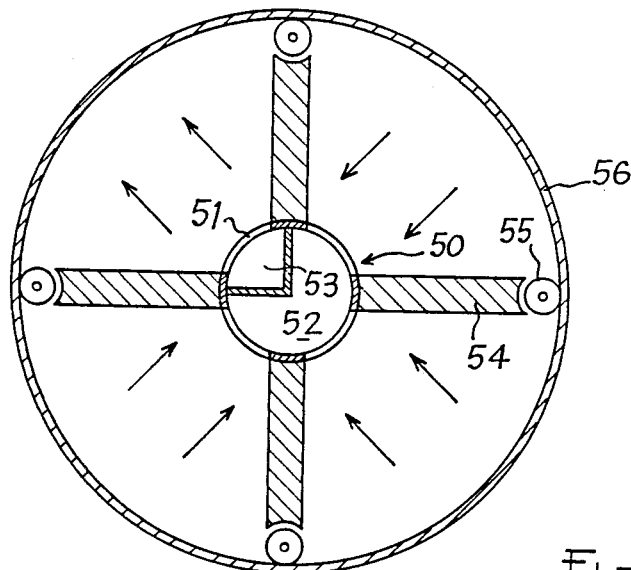
FIG. 16 is a cross-section on a larger scale showing a characteristic element of a machine in accordance with the invention.

One suitable form of embodiment for the frames 31 and 32 consist in a gantry structure suitable for delimiting bearings 47 and 48 on same-side supports and themselves suitable for being put into communication with conduit 49 for providing pressure or suction. The bearings 47 and 48 support the fixed structure 50 of each of the cylinders 13 and 14, as illustrated in FIG. 16. The fixed structure 50 may, for example, be constituted by a tubular mandrel 51 which is internally subdivided by suitably disposed partitions into one or more chambers 52 and 53 for conveying pressure or suction. The tubular mandrel 51 carries outwardly extending radial partitions 54 which are provided at their far ends with rolls 55 for centering and supporting a thin rotating cylindrical envelope 56 which is perforated over its entire area. The above arrangement makes it possible for different sectors between the mandrel 51 and the envelope 56 to be put into communication with chambers for supplying pressure or suction. The bearings 47 and 48 support drive means (not shown) for individually rotating the envelopes 56 of the cylinders 13 and 14.

The invention is not limited to the examples described and shown, and numerous modifications may be made thereto without going beyond the scope of the claims.

We claim:

1. A machine for forming a flat stack of sheets of predetermined format, each of said sheets being provided on one of its faces with parallel stripes of glue at a constant pitch or interval (p), the machine comprising:
    means for picking up a sheet and wrapping at least a portion of a sheet over a pick-up and applicator device constituted by first and second mutually parallel rotary cylinders disposed over a work surface defining a laying template whose median axis is referenced and which is provided with a first sheet, such that the sheet to be stacked is wound over the first cylinder making contact therewith via its face which does not include stripes of glue;
    means for counting the number of stripes of glue that pass while the sheet is being wrapped onto the device;
    means for stopping cylinder rotation when the detected middle stripe of the sheet is located approximately vertically over the median axis;
    means for measuring the error between the position of said middle stripe and the median axis of the laying template;
    means for adjusting the position of said device to cause said middle stripe to coincide vertically with the median axis;
    means for bringing the work surface and said device closer to each other;
    means for fixing the sheet to be stacked on the preceding sheet by localized melting of the middle stripe of glue;
    means for separating the two cylinders to unwrap the two halves of the sheet to be stacked and to apply them against the preceding sheet;
    means for moving the work surface and said device apart from each other;
    means for moving the cylinders towards each other; and
    means for picking up the next sheet under the same conditions and, additionally, ensuring that after adjusting the position of the middle stripe relative to the median axis, said stripe is offset in alternation relative to said axis through a distance equal to one half of the pitch.

2. A machine according to claim 1, wherein said means for picking up a sheet operate by means of a suction effect from the cylinders in combination with the cylinders rotating.

3. A machine according to claim 1 or 2, wherein said means for picking up a sheet operate by wrapping each sheet in part around the periphery of each cylinder.

4. A machine according to claim 1, wherein said means for moving the cylinders away from each other serve to displace them on either side of the application position substantially in parallel and in contact with the last sheet to be stacked.

5. A machine according to claim 1, wherein said means for wrapping a sheet comprise said first and second cylinders rotating in the same direction and including means enabling a sheet to be wrapped around substantially one half of the periphery of each of them.

6. A machine according to claim 1, wherein said means for wrapping a sheet comprise said first and second cylinders rotating in opposite directions and including means enabling a sheet to be wrapped around substantially three fourths of the periphery of each of them.

7. A machine according to claim 1, including means for moving the cylinders apart from each other away from the application position, while displacing them substantially in parallel and in contact with the last stacked sheet, means for moving both cylinders away from the work surface, while returning the second cylinder to its pick-up position and returning the first cylinder to its application position, means for moving the first cylinder and the work surface towards each other so as to bring the first cylinder into contact with the sheet which has just been applied, means for displacing the first cylinder towards the pick-up position while it is engaged against the second half of the sheet which has just been applied, and means for moving said first cylinder and the work surface apart and bringing the first cylinder to its pick-up position in the vicinity of the second cylinder.

8. A machine according to claim 1, wherein the means for fixing the sheet in position after being wrapped around said device and prior to the cylinders being moved apart, are constituted by heater means carried by the first cylinder.

9. A machine for forming a flat stack of sheets of predetermined format, each of said sheets being provided on one of its faces with parallel stripes of glue at a constant pitch or interval (p), comprising:
    a horizontal work surface carried by raising and lowering means and delimiting a laying template defining a median transverse axis;
    a superposed delivery plane for conveying individual sheets bearing stripes of glue and having their non-glued face lying on said plane;
    a pair of horizontal axis suction cylinders lying between said conveyor plane and said work surface, said cylinders being disposed on either side of a vertical median plane (P—P'), and being mounted on frames carried by two slideway systems extending parallel to the work surface, and connected to suction means;
    means for counting up to the middle glue stripe (x—x') of each sheet relative to the reference position of the transverse median axis of the template;
    means for simultaneously indexing and clamping the frames in a reference position for the middle glue stripe of each sheet relative to the median axis of the work surface template;

means for localized gluing of the middle stripe of the sheet to be applied; and drive means individual to each chassis and suitable for alternating displacement along the slideways.

10. A machine according to claim 9, wherein the pair of cylinders is associated with means for simultaneously driving the frames from a pick-up position to an application position relative to the transverse median axis of the laying template.

11. A machine according to claim 9 or 10, wherein each cylinder of the pair comprises a fixed structure surrounded by a rotary perforated cylindrical envelope together with which it delimits internal annular sectors which are in communication with pressure and/or suction circuits.

12. A machine according to claim 9, wherein the means for localizing gluing of the middle stripe are disposed between the cylinders of the pair.

13. A machine according to claim 9, wherein the means for localizing gluing of the middle stripe are carried by the fixed structure of the first cylinder of the pair encountered in the sheet-wrapping direction.

14. A machine according to claim 9, wherein that the pair of cylinders comprise a first rotary cylinder having a suction zone extending over two successive fourths of its periphery, and a second rotary cylinder rotating in the same direction and likewise having a suction zone extending over two successive angular fourths of its periphery and situated on the opposite side thereof about the vertical median plane of the pair (P—P') compared with the suction fourths of the first cylinder.

15. A machine according to claim 9, wherein the pair of cylinders comprise a first rotary cylinder having a suction zone extending over three successive fourths of its periphery, and a second rotary cylinder for rotating in the opposite direction to the first cylinder and having a suction zone extending over substantially all of its periphery.

* * * * *